United States Patent [19]

Kusserow et al.

[11] Patent Number: 4,930,034
[45] Date of Patent: May 29, 1990

[54] PROTECTIVE CIRCUIT FOR A POWER PACK FOR EXCITATION OR DE-EXCITATION OF A SUPERCONDUCTION COIL SYSTEM

[75] Inventors: Bernd Kusserow, Erlangen; Klaus Gagneur, Baiersdorf; Siegfried Hofler, Buckenhof, all of Fed. Rep. of Germany

[73] Assignee: Siemens Aktiengesellschaft, Berlin and Munich, Fed. Rep. of Germany

[21] Appl. No.: 217,970

[22] Filed: Jul. 12, 1988

[30] Foreign Application Priority Data

Jul. 13, 1987 [DE] Fed. Rep. of Germany ....... 3723127

[51] Int. Cl.$^5$ .............................................. H02H 7/20
[52] U.S. Cl. ........................................ 361/19; 361/8; 361/91
[58] Field of Search ............... 361/3, 8, 13, 19, 54, 361/55, 56, 91, 111, 117, 118, 100, 101, 119

[56] References Cited

U.S. PATENT DOCUMENTS

| | | | |
|---|---|---|---|
| 3,215,896 | 11/1965 | Shattuck et al. | 361/55 |
| 3,614,531 | 10/1971 | Oswald | 361/56 |
| 3,845,373 | 10/1974 | Totsu et al. | 361/91 X |
| 3,947,726 | 3/1976 | DeCecco et al. | 361/56 |
| 3,982,137 | 9/1976 | Penrod | 361/8 |
| 4,424,544 | 1/1984 | Chang et al. | 361/56 |
| 4,586,104 | 4/1986 | Standler | 361/56 |
| 4,631,621 | 12/1986 | Howell | 361/8 X |
| 4,715,058 | 12/1987 | Lechner et al. | 361/91 X |

FOREIGN PATENT DOCUMENTS

| | | | |
|---|---|---|---|
| 1513448 | 10/1969 | Fed. Rep. of Germany | 361/56 |
| 2026990 | 9/1970 | France | 361/56 |

*Primary Examiner*—William M. Shoop, Jr.
*Assistant Examiner*—A. Jonathan Wysocki

[57] ABSTRACT

A protective circuit for a power pack for exciting or de-exciting a superconducting system has a voltage monitoring circuit at the output of the power pack. A switch in parallel to the output of the power pack is closed by the voltage monitoring circuit as soon as output voltage exceeds a predetermined value in a direction opposite a supply voltage of the power pack. During a malfunction, the switch closes and conducts the current which is being driven by the superconducting coil system. The protective circuit can be utilized in devices such as superconducting magnets of a tomography apparatus.

6 Claims, 1 Drawing Sheet

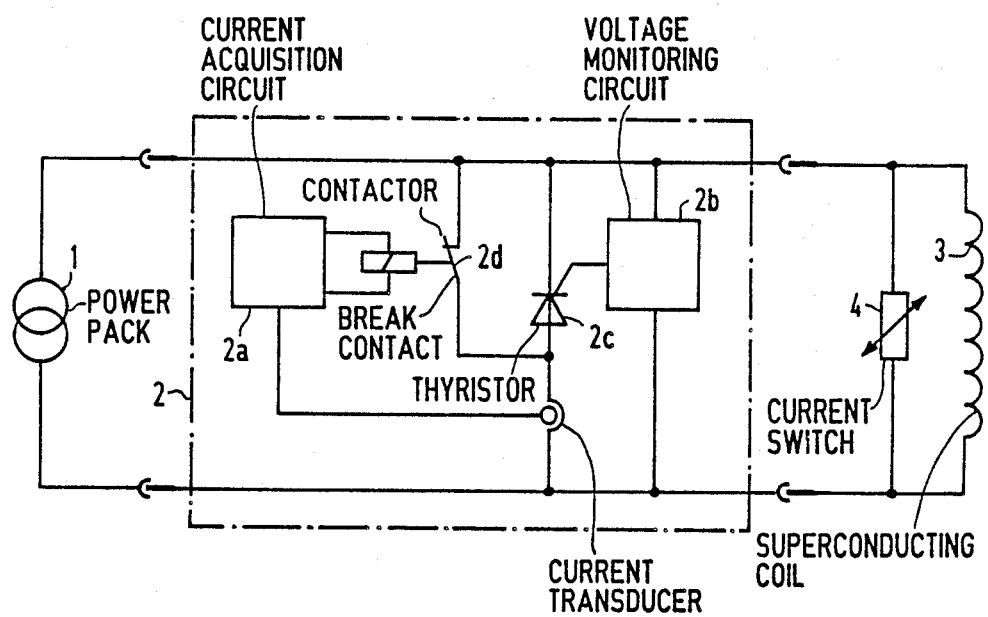

PROTECTIVE CIRCUIT FOR A POWER PACK FOR EXCITATION OR DE-EXCITATION OF A SUPERCONDUCTION COIL SYSTEM

BACKGROUND OF THE INVENTION

1. Field of the Invention

The present invention relates to protective circuits with power pack for excitation or de-excitation of superconducting coil systems.

2. Description of the Prior Art

In order to apply a current to a superconducting coil, a power pack means having a current source is connected in series with the coil. The supply current of this power pack is continuously increased for excitation until a desired amperage is obtained, then a current switch connected in parallel with a superconducting coil is closed. The superconducting coil current then flows in a closed loop through the current switch and the power pack is shut off. When the superconducting coil current is to be modified, the power pack is turned on again and the current switch is opened. The superconducting coil amperage can then be brought to a desired level using the power pack.

Given this arrangement, if the current switch is inadvertently opened when the power pack is shut off (for example, due to an unintentional quench this is a transition into the normally conducting condition), the entire current of the superconducting coil suddenly flows through the power pack causing a voltage drop in a direction opposite the supply voltage of the power pack, which could severely damage the power pack. In order to prevent such an occurrence, conventional power packs are partially short-circuited at the output in the off condition by thyristors or by contactors.

This arrangement, however, fails to protect the power pack against errors during excitation or de-excitation, since a short-circuit at the output cannot exist during this time period. During a malfunction (for example, an outage of the power supply or a malfunction in the current source), the power pack can no longer supply the same level of current flowing through the superconducting coil during excitation or deexcitation. Therefore, the inductance of the superconducting coil continues to drive current through the power pack and, depending upon the internal resistance of the power pack, this can lead to a high voltage drop and possible destruction of the power pack.

Generally, superconducting coils are independently protected against over voltages by protective devices connected in parallel, which are situated in a cryostat. Energy stored in the superconducting coil is, however, undesireably disseminated through these protective devices due to their conductivity. Unwanted quenching of the superconducting coil occurs due to the heat generated by the protective devices causing evaporation of the helium used to cool the coil.

SUMMARY OF THE INVENTION

It is an object of the present invention to protect such a power pack against possible damage from a disturbance during excitation and de-excitation without disseminating energy through the superconducting coil system or the power pack.

The above object is achieved in accordance with the principles of the present invention by utilizing a voltage monitoring circuit for the output voltage of the power pack wherein a first switch of the voltage monitoring circuit is closed as soon as the output voltage exceeds a prescribed value in a direction opposite the supply voltage of the power pack. Thus, the superconducting coil voltage during a malfunction, for example, opening the current switch or an outage of the power pack means, is kept low.

An extremely low resistance of the protective circuit maintains a low level of power dissipation through the protective circuit. Consequently, the protective circuit can be constructed using small dimensions. The low resistance of the protective circuit also results in minimal modification of the electric field and current resulting from a disturbance. For example, the excitation process following a brief disturbance can be maintained with a current that is only slightly reduced.

In a preferred embodiment, the first switch can have a quick response time with a small current load and a second, slower switch having a larger current load is connected in parallel to the first switch. The second switch is closed when the voltage at the output of the power pack exceeds a prescribed value in a direction opposite the supply voltage of the power pack of the current through the protective circuit exceeds a predetermined, maximum value.

A thyristor can be used as the first switch and a contactor can be used as the second switch. A thyristor reacts very quickly to an overvoltage and needs only dissipate power for a short period of time. For this reason, the cooling element of the protective circuit can be small. The contactor in turn conducts the current through the superconducting coil with very little voltage drop.

Re-activation of the power pack without additional steps becomes impossible if the contactor is designed to open as soon as the current through the protective circuit falls below a predetermined value.

In a preferred embodiment, a contact of a switching device which opens upon operation of the device (such as a breakcontact of a contactor) can be used as a switch. The function of the voltage monitor thus becomes independent of any auxiliary voltages since the contactor closes during an outage of the voltage supply. This assures that the protective circuit takes effect even during a main outage or an outage of the drive for the contactor.

BRIEF DESCRIPTION OF THE DRAWINGS

FIG. 1 is a schematic diagram of a superconducting coil system constructed in accordance with the principles of the present invention.

DESCRIPTION OF THE PREFERRED EMBODIMENTS

A superconducting coil system constructed with the addition of the present invention is schematically shown in FIG. 1. The system includes a power pack 1, a superconducting coil 3, and a current switch 4 all connected in parallel. The protective circuit 2 is added to the above superconducting coil circuit, also in parallel between the power pack 1 and the current switch 4.

The superconducting coil system 3 can be excited by a current generated by the power pack 1 when the superconducting current switch 4 is open. When the current in the superconducting coil system 3 reaches the desired value, the superconducting circuit is closed by closing the current switch 4. The power pack 1 can then be shut off. A re-excitation of the superconducting coil system 3 to modify the coil current is possible utilizing the power pack 1 when the current switch 4 is open.

Possible previously mentioned malfunctions in the circuit (for example, outage of the power pack 1 or opening of the current switch 4) can lead to severe damage of the power pack means 1 and/or a quenching of the superconducting coil system 3 unless additional measures are taken. To prevent the detrimental effects of these possible malfunctions, a protective circuit 2 including a voltage monitoring circuit 2b, a solid state switching device 2c (such as a thyristor), a heavy duty relay 2d (such as a contactor), and a current aquisition circuit 2a can be utilized as shown in FIG. 1. The thyristor 2c is connected in parallel to the output of the power pack 1 and is triggered by the voltage monitoring circuit 2b, which is also in parallel to the output of the power pack 1. The thyristor 2c is triggered when the voltage at the output of the power pack 1 assumes a predetermined value opposite the supply voltage of the power pack 1. A contactor 2d is also connected in parallel with the thyristor 2c. The current aquisition circuit 2a measures the current flowing through the contactor 2d and the thyristor 2c.

When, due to the previously mentioned malfunctions, the output voltage of the power pack 1 exceeds a value established with the voltage monitoring circuit 2b in a direction opposite the supply voltage of the power pack 1, the thyristor 2c is triggered, allowing the current supplied by the superconducting coil 3 to flow through the thyristor 2c. The quick response time of the thyristor 2c enables it to react very quickly and conduct this current. However, since thyristors have an on-state voltage at about one volt the power to be dissipated can assume considerable values, the current load in small cooling elements is limited.

In order to avoid this problem, when a predetermined current through the thyristor 2c is reached, as determined by the current acquisition circuit 2a, the contactor 2d is driven. The lower on-state dc resistance of the contactor 2d enables it to assume the full current, allowing the thyristor 2c to be quenched. As a consequence of the low operating dc resistance of the contactor 2d, the voltage drop and power dissipation are very low. This has the advantage, during a malfunction, that only a small amount of energy is lost from the superconducting coil system 3, resulting in very little current decrease. Thus, for example, following a brief malfunction period during the excitation process, excitation can be maintained by a current which is only slightly modified.

When the power pack 1 becomes functional again and an excitation or de-excitation process is re-started, the current supplied by the power pack 1 is set to the current level flowing in the superconducting coil system 3. This allows the current being conducted through the protective circuit 2 to be reduced. The current acquisition circuit 2a opens the contactor 2d when a predetermined current is reached. Since the thyristor 2c is quenched, the short-circuiting of the power pack 1 is no longer present.

Because the function of the protective circuit 2 is important when the main voltage is out, the protective circuit 2 must remain functional when the voltage supply is not. The simplest way to achieve this is for the contactor 2d to be equipped with a contact that opens upon activation of the contactor, such as a break-contact, so that the protective circuit 2 is always short-circuited in the absence of a voltage supply. When the voltage supply is switched on, the current acquisition circuit 2a supplies a control current for the contactor 2d as long as it has not responded, so that the contactor 2d remains open in this case. Given the response of the current acquisition circuit 2a, the control current for the contactor 2d is shut so that the break-contact closes and the desired short-circuiting of the power pack 1 is achieved.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A protective circuit comprising:
    means, adapted for connection across a power pack means for generating a supply voltage having a polarity at an output for exciting or deexciting a superconducting coil system, for monitoring a voltage across said output of the power pack means;
    a switch connected in parallel to the output of said power pack means and being conductive, when closed, at least in a direction opposite to said polarity of said supply voltage; and
    means, responsive to said means for monitoring, for closing said switch when said voltage across said output of said power pack means exceeds a predetermined value in a direction opposite said supply voltage of said power pack means so that current previously flowing in said superconducting coil is conducted through said switch.

2. A protective circuit as in claim 1 wherein said switch has a quick response time with a low current load, and further comprising:
    a further switch having a slower response time than said switch, said further switch being connected in parallel to said switch; and
    means responsive to said means for monitoring for closing said further switch when said output voltage of said power pack means exceeds a determined value in a direction opposite said supply voltage of said power pack means.

3. A protective circuit as claimed in claim 2, wherein said means for closing said further switch is a means for closing said second switch when current through said protective circuit exceeds a predetermined, maximum value.

4. A protective circuit as claimed in claim 2 wherein said further switch is a thyristor and said second switch is a contactor.

5. A protective circuit as claimed further in claim 2, comprising means for opening said further switch, following closing of said further switch, as soon as current through said protective circuit falls below a predetermined value.

6. A protective circuit as claimed in claim 5 wherein said further switch is a contactor and wherein said means for opening is a break-contact of said contactor.

* * * * *